Figure 1:
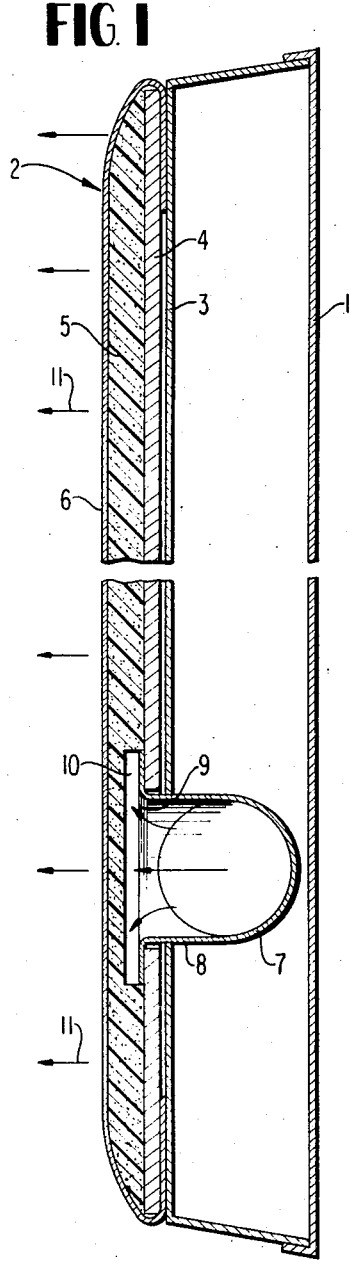

United States Patent [19]
Korinth

[11] 3,719,134
[45] March 6, 1973

[54] VENTILATING SYSTEM FOR VEHICLES

[75] Inventor: Hans Korinth, Sindelfingen, Germany

[73] Assignee: Daimler-Benz Aktiengesellschaft, Stuttgart-Unterturkheim, Germany

[22] Filed: Dec. 29, 1970

[21] Appl. No.: 102,415

[30] Foreign Application Priority Data

Dec. 30, 1969 Germany..................P 19 65 574.4

[52] U.S. Cl............................................98/2, 98/2.03
[51] Int. Cl. ................................................B60h 1/24
[58] Field of Search....................98/2.00, 2.03, 2.05

[56] References Cited

UNITED STATES PATENTS

| | | | |
|---|---|---|---|
| 3,550,523 | 12/1970 | Segal | 98/2.03 |
| 2,978,972 | 4/1961 | Hake | 98/2.03 |
| 2,992,604 | 7/1961 | Trotman | 98/2.03 |
| 3,277,811 | 10/1966 | Fischer | 98/2.05 |

*Primary Examiner*—Meyer Perlin
*Attorney*—Craig & Antonelli

[57] ABSTRACT

A heating and/or ventilation system for vehicles, in particular for motor vehicles in which air is supplied by means of a blower through ducts, lines or the like into the vehicle interior; the discharge apertures of the lines, channels or the like are thereby arranged behind cover parts of the vehicle interior or behind cushioned parts in the vehicle interior and the supplied air is distributed on all sides inside the cover parts or cushion parts and is discharged from the same through a large number of apertures.

8 Claims, 2 Drawing Figures

PATENTED MAR 6 1973　　3,719,134

INVENTOR
HANS KORNATH

BY Craig, Antonelli, Stewart & Hill

ATTORNEYS

VENTILATING SYSTEM FOR VEHICLES

The present invention relates to a heating and/or ventilating system for vehicles, especially motor vehicles, with air supplied from a blower, which is conducted through channels, lines or the like into the vehicle interior.

It is disadvantageous with known installations for the heating and/or ventilation of vehicles that the heating and/or ventilation does not take place in a draft-free manner. The heated air or the fresh air is discharged out of the mouths of pipes, channels or the like in a more or less concentrated flow and causes draft appearances with the unpleasantnesses and inconveniences connected therewith.

Consequently, the present invention is concerned with the task to provide a draft-free heating and/or ventilation. The underlying problems are solved according to the present invention in that the orifices of the channels, lines or the like are arranged behind areal cover parts of the vehicle interior or behind cushioned parts in the vehicle interior, i.e., behind large surfaces, and the supplied air is distributed on all sides within the cover parts or cushioned parts and leaves the same through a large number of apertures or openings.

An air supply is attained by the distribution of the air and discharge of the air out of a large number of small openings distributed over a large surface in an advantageous manner and without reduction of the rate of air flow, by means of which disadvantageous draft appearances cannot occur. Therebeyond, it is achieved that the cover parts are heated or cooled in their entirety so that the heating or ventilation is reinforced.

In an advantageous embodiment of the subject matter of the present invention, the cover part or the cushion part may consist of a closed wall with an opening for the mouth of the line conducting the air, of an air-permeable intermediate layer secured at this wall, for example, in the form of a plate, and of an air-permeable cover. In order that the distribution of the air is increased in the intermediate layer, the intermediate layer may be provided with a hollow space within the area of the discharge of the line supplying the air. For the same purpose, the intermediate layer may be provided at its backside abutting at the closed wall with a large number of channels.

In an advantageous manner, the intermediate layer may consist of an open-porous, foamed plastic material, and in particular of a conventional open-porous foamed synthetic resinous material.

Accordingly, it is an object of the present invention to provide a heating and/or ventilation system for motor vehicles which avoids by simple means the aforementioned shortcomings and drawbacks encountered in the prior art.

Another object of the present invention resides in a heating and/or ventilation system for vehicles which effectively eliminates the appearance of drafts within the vehicle, caused by the heating and/or ventilating air.

A further object of the present invention resides in a heating and/or ventilation system for vehicles which utilizes a simple construction, avoiding drafts on the inside of the vehicle while at the same time enhancing the heating and/or cooling of the vehicle interior parts, thereby increasing the comfort to the driver and passengers.

Figure 2:
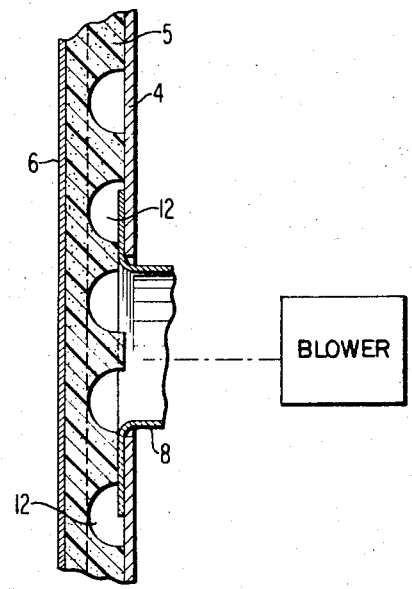

These and further objects, features and advantages of the present invention will become more obvious from the following description when taken in connection with the accompanying drawing which shows, for purposes of illustration only, two embodiments in accordance with the present invention, and wherein:

FIG. 1 is a partial cross-sectional view through a side wall of a vehicle body with a cover structure in accordance with the present invention; and FIG. 2 is a partial cross-sectional view, similar to FIG. 1, through a modified embodiment of a cover structure in accordance with the present invention.

Referring now to the drawing wherein like reference numerals are used throughout the two views to designate like parts, and more particularly to FIG. 1, reference numeral 1 designates in this figure a hollow side wall of a motor vehicle which is provided at its inner side with a cover structure, generally designated by reference numeral 2. The cover structure 2 essentially consists of a closed wall 4 abutting against the sheet metal wall 3, of an air-permeable intermediate layer 5 through which the air can penetrate and of an air-permeable cover 6, permitting the air to leave therethrough. The wall 4 may, for example, consist of a hard-fiber plate of any known type. The intermediate layer 5 consists of an open-porous foamed plastic material, for example, of an open-porous foamed synthetic resionous material whereas the cover 6 consists either of a material such as a fabric or cloth penetrable by air or of a conventional plastic material, such as a synthetic resinous material provided with pores or the like.

A line 7 is arranged on the inside of the side wall member 1 through which heated air or fresh air can be supplied by means of a blower (not shown). The line 7 is extended by means of a short stub 8 through the sheet metal wall 3 and through the wall 4. A hollow space 10 is provided in the intermediate layer 5 in front of the discharge aperture or mouth 9 of this stub or short pipe connection 8.

Air forced out of the stub 8 into the hollow space 10 distributes itself on all sides in the intermediate layer 5 and enters through openings provided in the cover 6 into the vehicle interior in the direction of arrows 11.

It can be readily seen that the entire cover structure 2 is heated or cooled by the described arrangement and that the air enters draft-free into the vehicle interior distributed over a large surface.

In the case of the embodiment according to FIG. 2, the backside of the intermediate layer 5 is equipped with a number of channels 12 so that a good distribution of the air can take place.

While I have shown and described only two embodiments in accordance with the present invention, it is understood that the same is not limited thereto but is susceptible of numerous changes and modifications as known to those skilled in the art; the present invention can also be utilized, for example, on vehicle doors or on vehicle roofs. However, it is also possible to equip cushioned seats and backrests with cover structures in accordance with the present invention. Consequently, I do not wish to be limited to the details shown and described herein but intend to cover all such changes and modifications as are encompassed by the scope of the appended claims.

What I claim is:

1. A ventilation system for vehicles with a forced air supply conducted into the vehicle interior by way of line means comprising an outer impervious member of the vehicle, at least one interior panel member spaced from the outer impervious member of the vehicle, means for spacing the interior panel member from the outer impervious member, the panel member forming one of an interior wall and door panel, a discharge of the line means being arranged behind a portion of the interior panel member, the panel member including a closed wall with an opening for the discharge of the line means, a porous intermediate layer secured at the wall and having substantially the same porosity in all directions throughout the layer for distributing supplied air in all directions within the layer, and a porous cover means covering the intermediate layer for discharging air passing through the intermediate layer into the interior of the vehicle.

2. A ventilation system according to claim 1, characterized in that said panel member is a cushioned part in the vehicle interior.

3. A ventilation system according to claim 1, characterized in that the air is supplied by a blower.

4. A ventilation system according to claim 1, characterized in that said intermediate layer is provided with a hollow space within the area of the discharge of the line means.

5. A ventilation system according to claim 4, characterized in that the porous intermediate layer is provided at its backside abutting against the closed wall with a large number of channels for the distribution of air.

6. A ventilation system according to claim 5, characterized in that the intermediate layer essentially consists of an open-porous foamed synthetic resinous material.

7. A ventilation system according to claim 6, characterized in that said intermediate layer is in the form of a plate.

8. A ventilation system according to claim 7, characterized in that the closed wall is in the form of a hard-fiber plate abutting against a sheet metal wall spaced from the outer impervious member of the vehicle, the line means being arranged between the sheet metal wall and the outer impervious member.

* * * * *